United States Patent [19]

Polendo-Loredo

[11] Patent Number: 4,563,340
[45] Date of Patent: Jan. 7, 1986

[54] PROCESS FOR THE SECONDARY OBTENTION OF SODIUM CARBONATE FROM FLP WASTE LIQUOR

[75] Inventor: José Polendo-Loredo, Monterrey, Mexico

[73] Assignee: Industria del Alcali, S.A., Nuevo Leon, Mexico

[21] Appl. No.: 544,625

[22] Filed: Oct. 24, 1983

[30] Foreign Application Priority Data

Jul. 12, 1983 [MX] Mexico ................................ 197998

[51] Int. Cl.$^4$ .......................................... C01D 17/18
[52] U.S. Cl. .................... 423/186; 423/190; 423/423; 423/429; 23/302 T; 23/303
[58] Field of Search ............... 423/186, 189, 190, 421, 423/422, 423, 424, 429; 23/298, 302 T, 303

[56] References Cited

U.S. PATENT DOCUMENTS

| | | | |
|---|---|---|---|
| 1,359,097 | 11/1920 | Nishigawa | 423/424 |
| 1,488,002 | 3/1924 | Claude | 423/424 |
| 1,710,636 | 4/1929 | Gluud | 423/424 |
| 2,666,686 | 1/1954 | Miller et al. | 423/423 |
| 3,449,067 | 6/1969 | Schmitt et al. | 423/424 |

FOREIGN PATENT DOCUMENTS

| | | | |
|---|---|---|---|
| 688540 | 6/1964 | Canada | 425/424 |
| 462132 | 3/1937 | United Kingdom | 423/424 |

OTHER PUBLICATIONS

T. P. Hou, Manufacture of Soda, Reinhold Publishing Co. New York, N.Y., 1942, pp. 254–255, 263–264, 447–457.

Primary Examiner—Gary P. Straub
Attorney, Agent, or Firm—William H. Maxwell

[57] ABSTRACT

This invention is related to a process for the secondary obtention of sodium carbonate from a waste liquor (known as FLP waste liquor) containing principally sodium chloride, ammonium bicarbonate, ammonium chloride and carbon dioxide, which is obtained in the filtering section within the solvay process for the primary obtention of sodium carbonate, by adding a compound or a mixture of compounds sodium ions to the FLP waste liquor in the presence of carbon dioxide, in order to precipitate sodium bicarbonate therefrom, and treating the precipitation and sodium bicarbonate to obtain the secondary production of sodium carbonate.

8 Claims, 4 Drawing Figures

PROCESS FOR THE SECONDARY OBTENTION OF SODIUM CARBONATE FROM FLP WASTE LIQUOR

BACKGROUND OF THE INVENTION

This invention is related to a process known as the "Solvay Process" for the synthetic production of sodium carbonate from sodium chloride solutions, and it is intended mainly to obtain sodium carbonate secondarily from the waste known as FLP liquor of the process, thereby to negate the production of refuse and to increase the obtention of secondary products such as ammonium chloride and calcium chloride. In a conventional Solvay process for the primary obtention of sodium carbonate, the sodium chloride found in ore deposits is dissolved, so as to be pumped towards the treating plant where, after being purified in order to eliminate its impurities (generally consisting of $Ca^{++}$ and $Mg^{++}$), it is fed into an absorption tower where it will contact gaseous ammonia and carbon dioxide, thus producing an ammoniated and carbonated brine called CB liquor, according to the following reactions:

$$NH_3 + H_2O \rightarrow NH_4OH + Q_1 \qquad (1)$$

$$CO_2 + H_2O \rightarrow H_2CO_3 + Q_2 \qquad (2)$$

First of all, the CB liquor is generally passed through a carbonation column which is in the stage of washing and disincrustation or descaling of sodium bicarbonate so as to precarbonate it, whereby a precarbonated liquor known as CLP liquor is produced. This CLP liquor is then circulated through the carbonation columns in which it will counter-currently contact the gases derived from several concentrations of carbon dioxide (Top gas introduced at an adequate height into the middle part of the column and which contains nitrogen and approximately 42% of $CO_2$, and Bottom gas introduced through the bottom of the column and which contains nitrogen and approximately 75% of $CO_2$), thus producing a liquor known as CL liquor containing sodium bicarbonate in suspension, according to the following reactions:

$$NH_4OH + H_2CO_3 \rightarrow NH_4HCO_3 + H_2O + Q_3 \qquad (3)$$

$$NH_4HCO_3 + NaCl \rightleftharpoons NaHCO_3 + NH_4Cl + Q_4 \qquad (4)$$

The Cl liquor containing the sodium bicarbonate in the form of a precipitate, ammonium chloride in which the ammonia is fixed as well as small quantities of reagents which did not react (NaCl, $NH_4HCO_3$, $H_2O$), is then filtered to obtain sodium bicarbonate in the form of a cake which dries and calcinates afterwards, so as to obtain sodium carbonate or light soda ash as a product and to recover part of the $CO_2$, $NH_3$ and $H_2O$ in gaseous form, according to the following reactions:

$$2NaHCO_3 + \Delta \rightarrow Na_2CO_3 + CO_2 + H_2O \qquad (5)$$

$$NH_4HCO_3 + \Delta \rightarrow NH_3 + CO_2 + H_2O \qquad (6)$$

on the first hand; and on the other hand a residual filtrate called FLP liquor composed chiefly of sodium chloride, ammonium bicarbonate, ammonium chloride and carbon dioxide.

In the conventional processes known at present the FLP waste liquor is subjected directly to distillation in order to recuperate a good part of free ammonia and $CO_2$, causing it to react with milk of lime in the section called PLM, in order to transform the ammonium chloride into ammonium hydroxide and calcium chloride into a final liquor known as DS integral, according to the following reactions:

$$2NH_4Cl + Ca(OH)_2 \rightarrow 2NH_4OH + CaCl_2 \qquad (7)$$

This DS integral liquor, which in fact keeps the same great volume of FLP liquor, is passed on to a solid separating plant at which DS sludge and a clear DS liquor are obtained. If calcium chloride is marketable, the same is extracted and the residual sludge is wasted along with the residual clear DS liquors. Obviously then, almost all of the plants for the industrial obtention of sodium carbonate which use the aforementioned Solvay process have to face the enormous problem of the production of a great volume of refuse, starting from the stage of separation of the sodium bicarbonate cake and the FLP liquor. Besides, in case it were possible to increase the production of the existing industrial plants, which as yet is not possible at these, because the production is based upon the reaction of ammonium bicarbonate with sodium chloride in the original carbonation reaction in accordance with equation No. 4, the maximum production of which is determined by the balance in the reaction, said circumstance will also cause cause a proportional increase of refuse liquor (whether of FLP liquor or of clear DS liquor). Additionally, even though some useful products could be derived from the waste liquors, there would still be a great volume of refuse. On the other hand, some research projects have been carried out in order to reduce the concentrations of noxious salts in the waste liquors, thus trying to recuperate a few secondary products such as ammonium chloride, for its use such as in the case of a dual process put into practice in Japan.

In this process ammonia is aggregated to FLP liquor and this is then cooled to precipitate the ammonium chloride, afterward adding sodium chloride to the remaining liquor so as to recirculate it to the precarbonator and to the carbonation tower, in order to re-use the ammonia and the carbon dioxide found in the same with a minimum of DS waste liquors. Nevertheless, and contrary to the possibility of increasing the production of sodium carbonate by recirculating the saturated liquor through the aggregation of salts (after the stage of cooling and of precipitation of the ammonium chloride), in the stage of carbonation the production of sodium carbonate keeps constant due to the reversible nature of the reaction which develops in the carbonator, which generally has a yield of 75% (equation No. 4). However, the possibility of obtaining a secondary production of sodium carbonate from other sources within the same process, has been neither envisioned nor studied thus far and there has been only one primary source for the production of sodium carbonate. To be inferred from the above, intense researching has been done in order to take advantage of the waste liquors, to recuperate part of the raw-materials normally consisting of carbon dioxide and ammonia and re-use them in the process.

In order to increase the production of sodium carbonate in the carbonation columns and to improve the size of the product's grain, several research projects were implemented to study the behavior of the operating conditions present in the carbonation columns. It was found that the carbonation columns were exceeded as to the per-column production capacity which caused a high flux both of carbon dioxide and ammonia gases, and of feeding liquor above their design values, thus affecting the time of residence and not allowing the reaction to take place in a satisfactory manner for want of area and time of contact, as observed in the analyses of the column discharges which contained a high degree of $CO_2$, indicating a poor absorption of $CO_2$. On this account the particles of sodium bicarbonate formed in the reaction were affected in their growth. It was precisely during said study that, through a series of laboratory analyses effecting the column discharge of the filtered liquor, it was observed that there existed stoichiometrical quantities of raw materials required for a greater precipitation of crystals of sodium bicarbonate. However, said precipitation had never been carried out, due mainly to the already known reason that, as the principal reaction between the sodium bicarbonate and the ammonium chloride reached its point of equilibrium it resulted in that, within the time determined by the reversible nature of this reaction the same moles produced on the right side of the reaction were the same as those on the left and so on; with no precipitation taking place at this point. Considering that, as it is well known, the constant of equilibrium is a function of the products of the concentrations of the products and of the reagents, the increase or decrease of any of them will alter the balance of the reaction in one way or another.

The foregoing situation led this inventor to take into account that, in order to precipitate a secondary quantity of sodium bicarbonate it was necessary to increase the concentration of one of the reagents in the FLP waste liquor, so as to cause the reaction to move to the right. Since the raw material more ready at hand was sodium chloride, it was decided to increase the concentration of same in the FLP liquors, which resulted in an amazing precipitation of a considerable quantity of crystals which were identified as crystals of sodium bicarbonate. It was also observed that this reaction could occur with other compounds or compound mixtures which included sodium (or alkaline metal) ions, such as sodium hydroxide or sodium sulfate, with which ammonium sulfate could be obtained as a secondary product, thus being useful in other industries. Notwithstanding the above, it is possible to increase the concentration of the other reagent, this is to say, the ammonium bicarbonate (as free ammonia) or gaseous ammonia and $CO_2$ in the FLP liquor, in order to accomplish the secondary production of sodium carbonate. But this reaction does not have a yield as high as the one in which sodium chloride is used.

SUMMARY OF THE INVENTION

The process for the secondary obtention of sodium carbonate is applied to the Solvay process for the primary obtention of soda ash and comprises the following basic stages: aggregating sodium chloride (or any compound or mixture of compounds including the sodium ion) and carbon dioxide to the FLP waste liquor containing sodium chloride, ammonium bicarbonate, ammonium chloride and carbon dioxide, which is obtained in the filtering stage within the process for the primary obtention of sodium carbonate by means of the ammoniation and carbonation of a sodium chloride solution; separating the sodium bicarbonate from the remaining liquor, called first remaining liquor, treating the sodium bicarbonate to obtain the secondary production of sodium carbonate; subjecting the liquor separated from the sodium bicarbonate to evaporation, so as to recuperate water and as much as possible of the sodium chloride which precipitates in this evaporation; separating the precipitated sodium chloride from the remaining liquor, called the second remaining liquor subjecting the liquor remaining from the separation of sodium chloride to a stage of crystallization, in order to precipitate the ammonium chloride; separating the precipitated ammonium chloride from the remaining liquor, called the third remaining liquor, in order to sell it after its washing and drying, or separating part of it for sale and recycling the remainder, or otherwise causing the whole charge to be recycled to the stage of distillation so as to recuperate the ammonia; and recycling the third remaining liquor filtered from the separation of ammonium chloride to the stage of evaporation mentioned above so as to negate the refuse.

OBJECTS OF THE INVENTION

It is a principal object of this invention to obtain a secondary production of sodium carbonate from FLP waste liquors of the Solvay process, by adding sodium chloride and carbon dioxide.

Another main object of this invention is to negate the refuse or DS liquors, since it is possible to separate totally or partially the ammonium chloride for its sale as well as to cause the remaining liquor to be recycled to the stage of distillation in order to recuperate the ammonia.

A third principal object of this invention is to provide a greater recuperation of the total salt (approximately at 95%), since this precipitates in the stage of evaporation of the filtrate resulting from the secondary obtention of sodium carbonate.

Furthermore, another object of this invention is to reduce in a significant manner the DS waste liquors in the subsequent stages of the process, for with this process, apart from the secondary production of sodium carbonate, it is possible to forward a suspension of ammonium chloride of 90% to 95% in volume, to the PLM section, in order to attain the following advantages:

(a) Increase of the total production of sodium carbonate;

(b) Decrease in the cost of operation for the handling of DS refuse;

(c) Increase of the capacity of the DS refuse pile;

(d) Increase of the capacity of the solid separating plant;

(e) Increase of the capacity of the piping as well as of the pumping of DS integral (sludge plus liquor).

Another object of this invention is to obtain a considerable increase of the capacity of the calcium chloride plant, due to an increase in the concentration of calcium chloride from an original 10% up to a final 20% through this process, besides diminishing the consumption of coke and limestone in the operation of the furnaces.

A further object of this invention is to provide a greater recuperation of the total salt in the process used conventionally, since the feeding of ammonium chloride to the PLM is no longer contaminated by salt.

Another object of this invention is to permit an increase in the life of the water wells, and to decrease the costs of operating and handling the same.

Still another object of this invention is to allow a total saving of raw-materials due to the secondary production of sodium carbonate from FLP liquor, thus reducing the unitary consumption of coke, $NH_3$ and $CO_2$; as well as to permit the inclusion of a new secondary or by-product in the form of ammonium chloride.

The foregoing and various other objects and features of this invention will be apparent and fully understood from the following detailed description of the typical preferred forms and applications thereof, throughout which description reference is made to the accompanying drawings.

PREFERRED EMBODIMENTS

This invention shall be described hereafter by making reference to the drawings solely as a means of illustration, wherein the numbers will be related to the parts of the figures shown. Furthermore and in order to make the invention clear, since this originates from one stage of the conventional Solvay Process, this conventional process will be described at first and the description of the process claimed as the invention shall follow suit.

STAGE OF PURIFICATION

Figure 1:
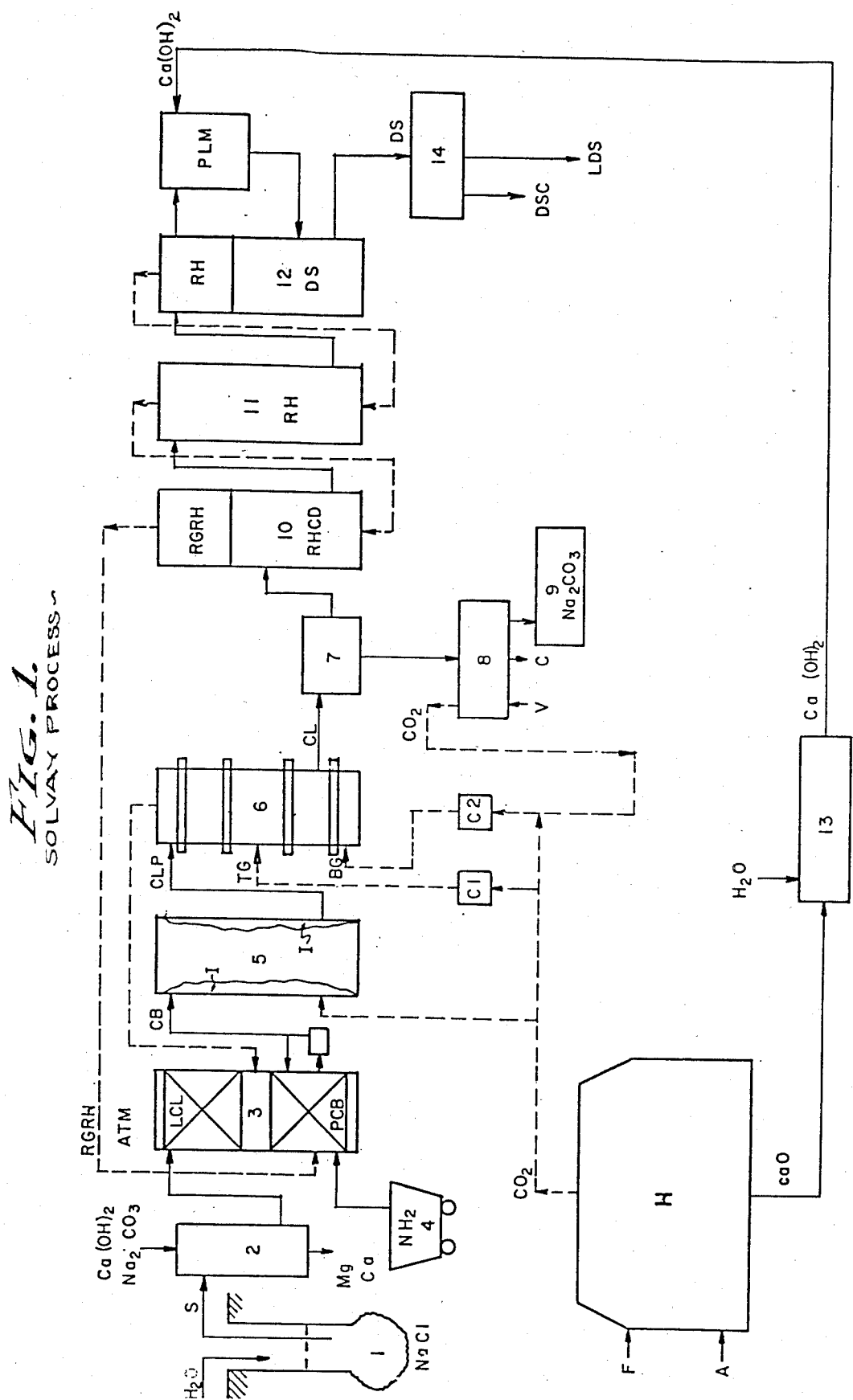
FIG. 1 is a flow chart of the conventional Solvay Process, which is presented herewith as a reference for understanding the process of this invention.

In the illustration of FIG. 1 appears the conventional Solvay Process whereby sodium chloride of mine 1 is diluted by the action of pressure water in order to obtain a brine S which is passed on into a purifier 2 in which the impurities of calcium and magnesium (principally) are precipitated as magnesium hydroxide and calcium carbonate, through a reaction with calcium hydroxide and sodium carbonate, thus providing a pure brine.

STAGE OF ABSORPTION

The pure brine is passed to an absorption tower 3 where it contacts anhydrous ammonia coming from loader 4, in the section of the tower known as PCB, and carbon dioxide coming from the RGRH section of the distillation tower 10, called RGRH gas (and which also contains light quantities of ammonia and water), so as to produce an ammoniated and carbonated brine known as CB liquor, in accordance with the following reactions:

$NH_2 + H_2O \rightarrow NH_4OH + Q_1$ (1)

$CO_2 + H_2O \rightarrow H_2CO_3 + Q_2$ (2)

PRECARBONATION AND CARBONATION STAGES

First of all, the CB liquor is passed to the carbonation column 5 which is in the stage of washing and disincrustation or descaling of incrusted sodium bicarbonate I to precarbonate it, thus producing a precarbonated liquor called CLP liquor which is then circulated through the carbonation column 6 where it contacts counter-currently Top Gas TG containing nitrogen and approximately 42% of $CO_2$ which is introduced at an adequate height of the column, and Bottom Gas BG containing nitrogen and approximately 72% of $CO_2$ which is introduced through the bottom of the column.

The Top Gas TG and the Bottom Gas BG are produced in a furnace H fed with coke and calcium carbonate by its upper part F and with air A through the base, including other effluents of the different stages of the process, and they are fed in their diverse concentrations into the carbonation column 6, through the C1 and C2 dosage compressors.

STAGE OF PRIMARY PRODUCTION OF SODIUM CARBONATE

A liquor known as CL liquor comes out of the carbonation columns 6, containing the primary production of sodium bicarbonate in suspension, according to the following reactions:

$$NH_4OH + H_2O \xrightarrow{CO_2} NH_4HCO_3 + H_2O + Q_3 \quad (3)$$

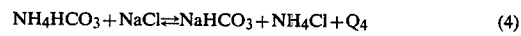
$$NH_4HCO_3 + NaCl \rightleftharpoons NaHCO_3 + NH_4Cl + Q_4 \quad (4)$$

Said CL liquor contains the sodium bicarbonate in the form of a precipitate, and ammonium chloride in which the ammonia is fixed, as well as small quantities of reagents such as sodium chloride, ammonium bicarbonate and water which did not react, thus passing the CL liquor through a filter 7 in order to obtain on the one hand a cake which dries and calcinates in a furnace 8 so as to obtain the primary production (and the only one in this process) of sodium carbonate known as light soda ash 9, and to recuperate part of the $CO_2$, $NH_3$ and $H_2O$ as gases which aggregate to the lines of Top Gas TG and Bottom Gas BG, according to the following reactions:

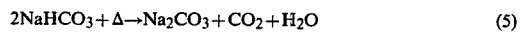
$2NaHCO_3 + \Delta \rightarrow Na_2CO_3 + CO_2 + H_2O$ (5)

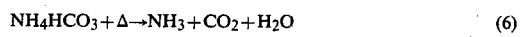
$NH_4HCO_3 + \Delta \rightarrow NH_3 + CO_2 + H_2O$ (6)

STAGE OF RECUPERATION

On the other hand, from filter 7 a residual filtrate known as FLP liquor is obtained composed mainly of ammonium bicarbonate, ammonium chloride, carbon dioxide and sodium chloride. This FLP liquor is successively fed into the columns of distillation 10 (through the RHCD section), 11 and 12 (through the RH section), in order to recuperate the gases of $CO_2$, $NH_3$ and $H_2O$, which will come out through the RGRH section to be fed back to the absorption tower 3 through the PCB section as RGRH gases.

STAGE OF FORMATION OF SECONDARY PRODUCTS

The distillate resulting or coming out of the distillation column 12 through its RH section is fed into a precalcifier PLM (or prelimer) where it reacts with calcium hydroxide and recirculates back to the column 12 through its DS section in which it recuperates the free ammonia, thus producing calcium chloride as a secondary product, or by-product, in accordance with the following reaction:

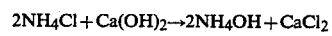
$2NH_4Cl + Ca(OH)_2 \rightarrow 2NH_4OH + CaCl_2$

The furnace H calcines the calcium carbonate to convert it into calcium oxide which is afterwards extinguished in the hydrator 13 to produce the calcium hydroxide which is fed into the PLM precalcifier. From the DS section of column 12 a suspension with sludge known as DS integral comes out and then is passed to a solid separator 14 in order to separate the clear DS liquor, which is the Solvay waste liquor, including approximately 10% of calcium chloride and 5% of sodium chloride, as well as LDS sludge as a refuse.

PROCESS FOR THE SECONDARY OBTENTION OF SODIUM CARBONATE

Figure 2:
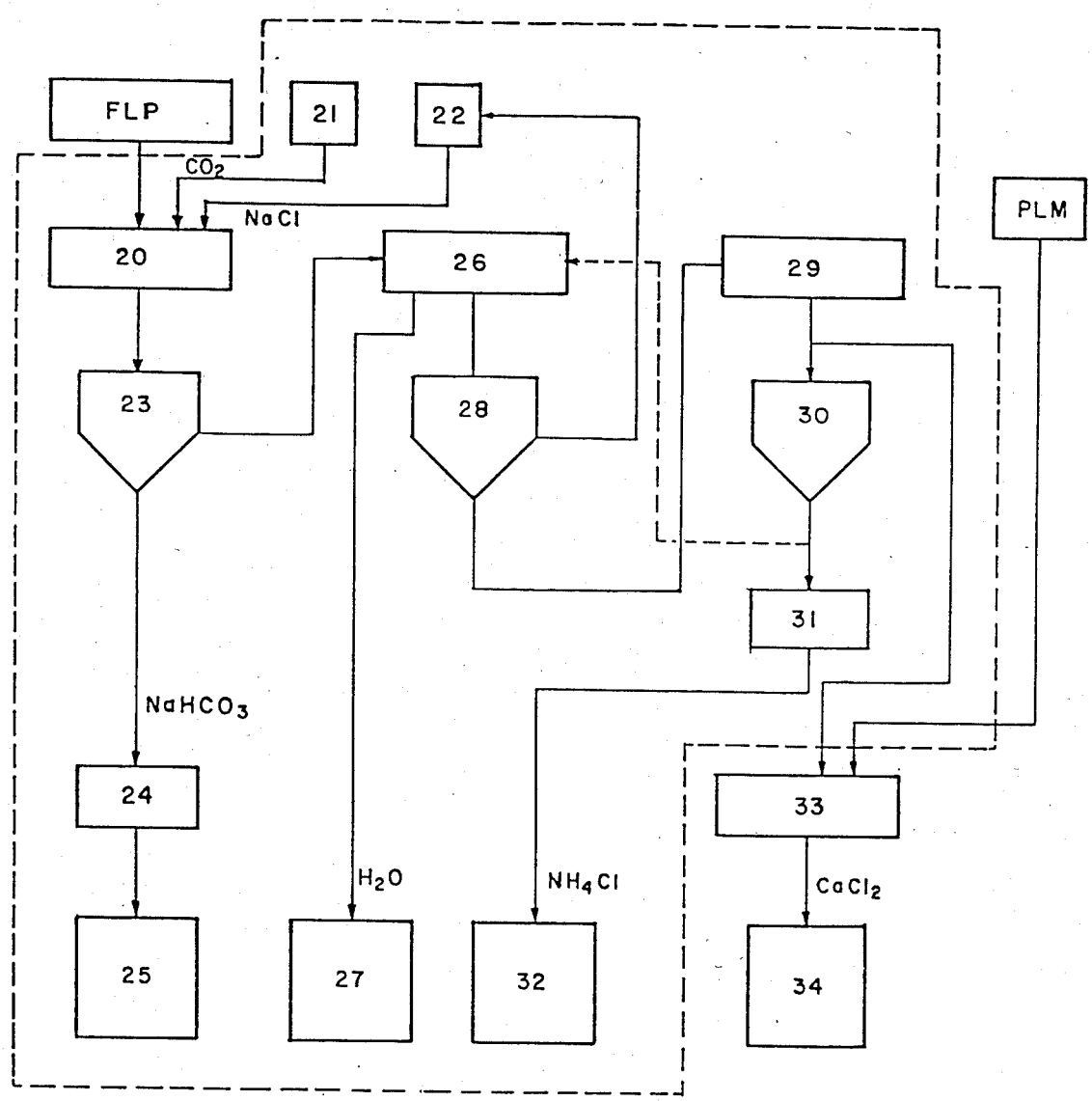
FIG. 2 is a block diagram of the improved process for the secondary obtention of sodium carbonate in accordance with this invention.
Figure 3:
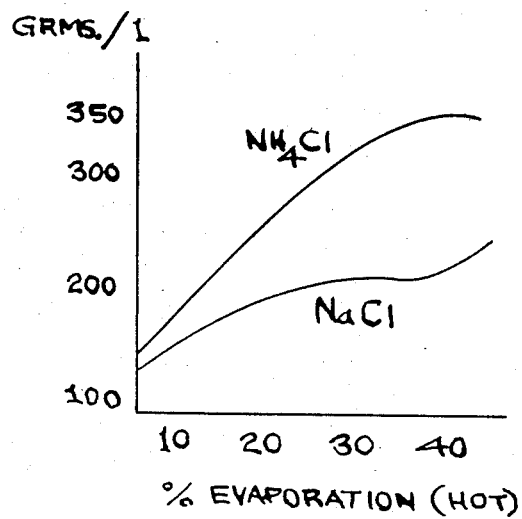
FIGS. 3 and 4 are graphs showing the percentages of evaporation of the hot and cooled liquors disclosed in TABLE 4.
Figure 4:
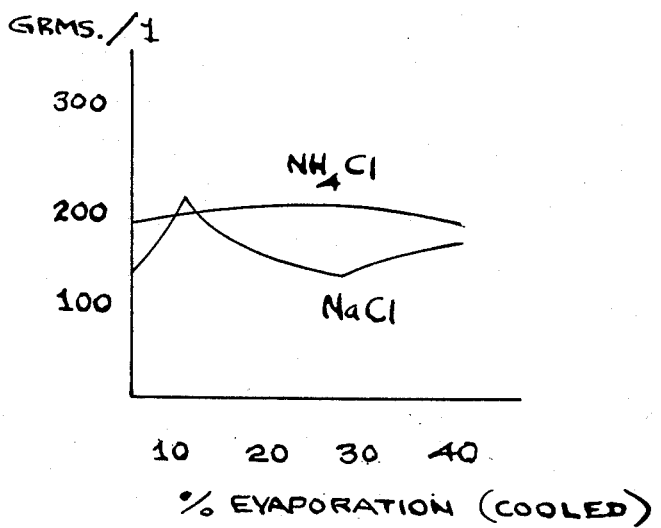

In accordance with the present invention, FIG. 2 of the drawings refers to the process for the secondary obtention of sodium carbonate claimed hereby as the invention and which originates from the FLP liquor, as it is obtained in the Solvay process, containing ammonium bicarbonate, ammonium chloride, carbon dioxide and sodium chloride, as raw material, and which instead of being subjected to distillation as in the conventional process, or of being treated with ammonia to recycle it as in the Japanese process, said process is "breached" in order to treat it as follows:

The FLP liquor is fed into a mixing tank 20 which in turn receives a current of $CO_2$ coming from the tank 21 and a feeding of NaCl coming from a deposit 22, so as to cause the mixture to react and giving as a result a secondary precipitation of sodium bicarbonate in a suspension which is separated in the filter 23. From the filter 23 a sodium bicarbonate cake is obtained on the one hand, which dries and calcines in a drier 24 so as to attain the secondary production of sodium carbonate 25. The clear liquor of filter 23, called the fist remaining liquor, is fed into an evaporator 26 to recuperate water, or a part thereof in a deposit 27 so as to be pumped to the brine well 1 or to be used in some other part of the process and to precipitate most of the quantity of NaCl filtered in the filter 28, in order to forward it to the deposit 22 for re-using it in the mixing tank 20. The strong or hard liquor coming from the filter 28, called the second remaining liquor, is passed on to a crystallizer 29 to precipitate the ammonium chloride. In case the whole production of ammonium chloride were marketable, the mixture of the crystallizer 29 is separated in the filter 30 and dried in the drier 31 and then stored in the deposit 32 to be put for sale, and the remaining liquor of the filter 30, called the third remaining liquor, is recirculated to the evaporator 26 so as to precipitate the remaining salt and to recuperate water and ammonium chloride, thus eliminating all refuse which could result from the process.

In case both the ammonium chloride and the calcium chloride are marketable, a part of the mixture of the crystallizer 29 is fed to the DS section of one distillation tower 33 (which is equivalent to the distillation tower 12 of FIG. 1) to react with the calcium hydroxide of the PLM and to obtain, in that way, the partial production of ammonium chloride in the deposit 32, and the partial production of calcium chloride in the deposit 34. Otherwise, if only calcium chloride is marketable then the mixture of the crystallizer 29 would be passed directly to the distillation tower 33 to react with the calcium hydroxide of the PLM, so as to produce calcium chloride in the deposit 34 following the preceeding trajectory of the process, but with the advantage of the total elimination of refuse.

SCALE PILOT TESTS

Under the researching conditions (which may be optimized and defined afterwards to industrial scale) at the Research and Development Laboratory ("laboratorio de Investigación y Desarrollo") of the plant of INDUSTRIA DEL ALCALI, S.A., located in Villa de García, N.L. Mexico, the remaining concentration of free ammonia (as $NH_4HCO_3$) and $CO_2$ from the liquor obtained in the filtering section and known as FLP liquor, were used with the aggregation of solid sodium chloride in presence or stream of gaseous an atmosphere of $CO_2$, based upon the following reaction:

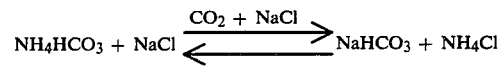

$$NH_4HCO_3 + NaCl \underset{}{\overset{CO_2 + NaCl}{\rightleftharpoons}} NaHCO_3 + NH_4Cl$$

The aggregation of salt and carbon dioxide changed the point of equilibrium to the right side of the reaction, resulting in $NaHCO_3$ precipitation, for which in order to optimize this reaction the following tests were carried out:

TEST No. 1

Four samples of one liter of FLP liquor and different quantities of NaCl were subject to continuous stirring until the complete dilution of salt, bubbling $CO_2$ during 20 minutes, thus resulting in a precipitate and a liquor. The analytic tests of the initial FLP liquor and of the precipitate, as well as their results, are illustrated in the following table:

TABLE 1

| | Vi c.c. | Vf c.c. | NaCL Aggregated grms. | $NH_{3L}$ T/20 | $NH_{3r}$ T/20 | $NH_{3f}$ T/20 | Cl T/20 | $CO_2$ T/20 | ρ grm/1 | $NH_4Cl$ T/20 | NaCl T/20 |
|---|---|---|---|---|---|---|---|---|---|---|---|
| (FLP) Original Liquor | 1000 | 980 | | 28.4 | 87.5 | 59.1 | 86.6 | 37.0 | 1119 | 59.1 | 27.5 |
| #1 | 1000 | 980 | 80.0 | 15.4 | 85.6 | 70.2 | 112.1 | 22.5 | 1140 | 70.2 | 41.9 |
| #2 | 1000 | 980 | 90.0 | 13.4 | 85.6 | 72.2 | 116.1 | 19.6 | 1142 | 72.2 | 43.9 |
| #3 | 1000 | 980 | 100.0 | 12.6 | 85.0 | 72.4 | 119.2 | 17.7 | 1147 | 72.4 | 46.8 |
| #4 | 1000 | 908 | 110.0 | 12.8 | 84.8 | 72.0 | 121.7 | 18.0 | 1150 | 72.0 | 49.7 |

TABLE 2

ANALYSES OF THE PRECIPITATES OBTAINED

| Test | Precipitate Weight in dried base grms. | % in weight NaHCO$_3$ | NaCl | NH$_4$HCO$_3$ | Real weight in grms. NaHCO$_3$ | Na$_2$CO$_3$ |
|---|---|---|---|---|---|---|
| #1 | 51.5 | 95.89 | 1.74 | 2.37 | 49.4 | 31.1 |
| #2 | 60.0 | 88.74 | 8.50 | 2.76 | 53.24 | 33.5 |
| #3 | 62.0 | 94.51 | 2.33 | 3.16 | 60.15 | 37.9 |
| #4 | 62.0 | 93.01 | 3.04 | 3.95 | 59.11 | 37.2 |

In order to carry out the analysis of precipitates, th solution was filtered in vacuum without washing and drying, at laboratory temperature.

TEST No. 2

Three samples of 3000 ml of FLP liquor were used, aggregating 330 grms of Na Cl (concentration 110 grms./l) and stirring and bubbling CO$_2$ during twenty minutes. The analytic results of the liquor and of the solids obtained are provided in Table 3.

TABLE 3

ANALYSES OF LIQUORS

| | V ml | NH$_{3l}$ | NH$_{3t}$ | NH$_{3f}$ | Cl | CO$_2$ | ρ grms/1 | NH$_4$Cl | NaCl |
|---|---|---|---|---|---|---|---|---|---|
| FLP | 3000 | 30.9 | 89.2 | 58.3 | 82.3 | 46.2 | 1,118.5 | 58.3 | 24.0 |
| 1 | 3000 | 17.2 | 86.2 | 69.0 | 117.6 | 22.2 | 1,149.3 | 69.0 | 48.6 |
| 2 | 3000 | 18.2 | 87.0 | 68.8 | 117.6 | 20.2 | 1,149.7 | 68.8 | 48.8 |
| 3 | 3000 | 18.0 | 86.2 | 68.2 | 116.6 | 21.0 | 1,148.6 | 68.2 | 48.4 |

ANALYSES OF THE SOLID DRIED IN THE OPEN AND WITHOUT WASHING

| Sample No. | Precipitate grms/1 | % dried base weight NaHCO$_3$ | NaCl | NH$_4$HCO$_3$ | Real weight grms./1 NaHCO$_3$ | Na$_2$CO$_3$ |
|---|---|---|---|---|---|---|
| 1 | 53.5 | 92.0 | 1.91 | 4.22 | 49.2 | 31.0 |
| 2 | 55.2 | 90.22 | 3.68 | 5.16 | 49.8 | 31.4 |
| 3 | 53.4 | 91.47 | 2.50 | 4.26 | 48.8 | 30.8 |

TEST No. 3

With the liquors resulting from Test No. 2, a mixture having a volume of 9.1 was prepared and used in this test in the following manner: four aliquot parts of one 1. each were taken, afterwards subjecting them to evaporation of 10%, 20%, 30% and 40%, respectively. After the evaporation a solid precipitate proportional to the evaporation effected was obtained. In every case, once the percentage of desired evaporation had been attained the (hot) resulting liquor was analyzed. Subsequently, the precipitate was separated from the liquid by filtering it in a vacuum and drying it at the temperature prevailing in the environment. The resulting liquor was cooled at 30° C., thus providing a new solid precipitate which was also filtered in vacuum and was dried at the temperature of the environment, then proceeding to analyze the solids obtained and the liquor, the results of which are shown in Table 4.

TABLE 4

TESTS AT DIFFERENT PERCENTAGES OF EVAPORATION ANALYSES OF HOT LIQUORS (grms./1)

| | ρ | NH$_4$Cl grms./1 | NaCl |
|---|---|---|---|
| FLP$_2$ Solution | 1.149 | 183.6 | 141.9 |
| Evaporation 10% | 1.1363 | 232.2 | 186.2 |
| Evaporation 20% | 1.1344 | 258.0 | 199.0 |
| Evaporation 30% | 1.1365 | 308.6 | 154.3 |
| Evaporation 40% | 1.1299 | 345.9 | 157.9 |

ANALYSIS OF FINAL LIQUOR (COOLED)

TABLE 4-continued

| % Evaporation | Vf ml | ρ grms./00 | NH$_4$Cl grms./1 | NaCl |
|---|---|---|---|---|
| 10 | 750 | 1,160 | 192.7 | 197.1 |
| 20 | 550 | 1,164 | 197.8 | 196.1 |
| 30 | 430 | 1,627 | 222.5 | 151.5 |
| 40 | 400 | 1,640 | 204.1 | 158.8 |

RECUPERATED PRODUCT (HOT FILTRATION)

| % Evaporation | Precipitate grms./1 | % Dried Base weight NH$_4$Cl | NaCl |
|---|---|---|---|
| 10 | 0.0 | | |
| 20 | 33.0 | 4.45 | 95.29 |
| 30 | 35.0 | 9.70 | 88.96 |
| 40 | 74.0 | 4.70 | 94.72 |

PRODUCT OBTAINED BY COOLING AT 30° C.

| % Evaporation | Precipitate grams./1 | % Dried Base weight NH$_4$Cl | NaCl |
|---|---|---|---|
| 10 | 59.0 | 84.89 | 14.68 |
| 20 | 86.2 | 91.96 | 7.66 |
| 30 | 110.0 | 87.73 | 11.2 |
| 40 | 116.0 | 93.47 | 5.87 |

TEST No. 4

This test was carried out to verify the yield of the process as a ratio between the precipitated quantity of NaHCO$_3$ and the NaCl aggregated. Three aliquot parts of FLP liquor, of 3 l each, were caused to react, aggregating 110 grams./l of NaCl and bubbling CO$_2$ by continuous stirring during twenty minutes, accomplishing the following results

TABLE 5

SOLID PRECIPITATED PER EVERY 3 LTS. OF SOLUTION

| Sample No. | grms. Precipitated | Equivalency grms./1 | COMPOSITION NaHCO$_3$ | NaCl % in weight | NH$_4$Cl |
|---|---|---|---|---|---|
| #1 | 153.9 | 51.3 | 69.69 | 6.93 | 23.02 |
| #2 | 159.6 | 53.2 | 70.66 | 8.09 | 21.23 |
| #3 | 155.0 | 51.6 | 76.28 | 6.38 | 17.31 |

ANALYSIS OF THE RESULTING LIQUOR

| | T/20 NH$_{3l}$ | NH$_{3T}$ | NH$_{3f}$ | Cl | CO$_2$ | ρ | grms/1 NH$_4$Cl | NaCl |
|---|---|---|---|---|---|---|---|---|
| FLP | 29.3 | 91.7 | 62.4 | 87.2 | 35.7 | 1.1172 | 166.7 | 72.4 |
| Sample #1 | 16.1 | 89.4 | 73.3 | 119.9 | 19.7 | 1.1539 | 195.8 | 136.1 |
| Sample #2 | 16.9 | 86.5 | 69.6 | 119.9 | 22.2 | 1.1463 | 186.0 | 147.0 |
| Sample #3 | 17.3 | 88.6 | 71.3 | 119.9 | 20.6 | 1.1565 | 190.5 | 142.0 |

TEST NO. 5

The results of the analyses of the preceeding test, indicated a poor purity in the solid precipitate and a very high concentration of sodium chloride in the solutions, causing a simultaneous precipitation of NaHCO$_3$ and NH$_4$Cl. for which the following test was effected diminishing the quantity of NaCl at 90 grms./1 under the same conditions, and attaining the results shown below.

TABLE 6

SOLID PRECIPITATED PER EVERY 3 LTS. OF SOLUTION

| Sample No. | grms. Precipitated | Equivalency grms./1 | NaHCO$_3$ | NaCl | NH$_4$Cl |
|---|---|---|---|---|---|
|  |  |  | COMPOSITION % in weight | | |
| #1 | 155.0 | 51.6 | 70.0 | 6.7 | 23.23 |
| #2 | 157.6 | 52.5 | 70.66 | 8.05 | 21.25 |
| #3 | 154.0 | 51.33 | 76.28 | 5.62 | 18.0 |

ANALYSIS OF THE RESULTING LIQUOR

| | T/20 | | | | | | grms./1 | |
|---|---|---|---|---|---|---|---|---|
| | NH$_{3l}$ | NH$_{3T}$ | NH$_{3f}$ | Cl | CO$_2$ | p | NH$_{4\,Cl}$ | NaCl |
| Original FLP | 26.7 | 91.7 | 65.0 | 86.7 | 42.0 | 1,1172 | 173.8 | 63.4 |
| Sample #1 | 17.4 | 90.6 | 73.2 | 120.4 | 27.7 | 1,1459 | 195.8 | 137.9 |
| Sample #2 | 17.1 | 91.2 | 74.1 | 120.4 | 28.5 | 1,1449 | 198.2 | 135.3 |
| Sample #3 | 16.9 | 91.9 | 75.0 | 120.4 | 26.5 | 1,1455 | 200.6 | 132.6 |

TEST NO. 6

As it was observed again in the previous test, impurities of NH$_4$Cl still precipitated with NaHCO$_3$, even though the concentration of NaCl had been diminished for which the same test was carried out once more, thus proving the precipitation of NH$_4$Cl one more time.

Searcing for the cause of the presence of such impurities, the following test was done by keeping the concentration of NaCl at 90 grms./1 and increasing the flux of CO$_2$ with the results shown below.

TABLE 7

SOLID PRECIPITATED PER EVERY 3 LTS. OF SOLUTION

| Sample No. | grms. Precipitated | Equivalency grms./1 | NaHCO$_3$ | NaCl | NH$_4$Cl |
|---|---|---|---|---|---|
|  |  |  | COMPOSITION % in weight | | |
| #1 | 147.0 | 49.0 | 90.1 | 3.3 | 6.4 |
| #2 | 147.6 | 49.2 | 93.84 | 2.73 | 3.33 |
| #3 | 147.2 | 49.1 | 91.7 | 3.1 | 5.1 |

ANAYSES OF THE RESULTING LIQUOR

| | T/20 | | | | | |
|---|---|---|---|---|---|---|
| | NH$_{3l}$ | NH$_{3T}$ | NH$_{3f}$ | CO$_2$ | Cl | p |
| Original FLP Liquor | 27.1 | 94.0 | 66.0 | 41.7 | 92.2 | 1,1175 |
| Sample #1 | 16.0 | 91.7 | 75.7 | 21.4 | 121.0 | 1,1451 |
| Sample #2 | 15.6 | 91.2 | 75.6 | 20.6 | 120.4 | 1,1456 |
| Sample #3 | 15.8 | 90.3 | 74.5 | 22.0 | 118.5 | 1.1453 |

This test showed an improvement as to the purity of NaHCO$_3$ and a low concentration of NaCl and NH$_4$Cl which no longer precipitated with the bicarbonate, thus proving the great significance of the quantity of CO$_2$ which is fed to the reacting mixture.

TEST NO. 7

From the liquor deriving of the preceeding tests (after the separation of NaHCO$_3$) the following test was done in order to determine the quantity of NaCl and NH$_4$Cl recuperated per liter of solution.

A volume of 3500 ml. of the resulting liquor was taken and a 10% of it evaporated to precipitate the ferrous hydroxide, and so as to liberate CO$_2$ and ammonia; proceeding afterwards with the filtering thereof in order to eliminate the ferrous hydroxide, and then continuing the evaporation until reaching 50%; since it was hot-filtered, 200 grms. of NaCl and a part of NH$_4$Cl (as impurity) were recuperated, accomplishing a volume of 1700 ml. which was cooled at the temperature prevailing in the environment, thus giving as a result a precipitation of NH$_4$Cl which was filtered too, providing 400 grms. of this and some of NaCl (as impurity), as well as a final liquid in a volume of 1000 ml.

TABLE 8

| ANALYSES OF THE LIQUORS | ANALYSES OF THE SOLIDS | |
|---|---|---|
| INITIAL | NaCl precipitate 200 grms. | NH$_4$Cl precipitate 400 grms. |
| V-3500 ml. | Composition | Composition |
| NH$_{3l}$-12.1 T/20 | NaCl   NH$_4$Cl | NaCl   NH$_4$Cl |
| NH$_3$-86.3 T/20 | 68%    31.9% | 2.8%   97.1% |
| NH$_{3f}$-74.2 T/20 | After washing the salt | Equivalent to |
| Cl-116.3 T20 | 38.8 grms./1 are recuperated | 110 grms./1 |
| CO$_2$-19.7 T/20 | | |
| FINAL | | |
| 1000 ml. | | |
| NH$_4$Cl-189.2 grms./1 | | |
| NaCl -172.1 grms./1 | | |

After precipitating NH$_4$Cl, the final liquor reacted with CA(OH)$_2$ (milk of lime) liberating ammonia and resulting in a liquor with the following composition:

TABLE 9

| Final Liquor Without Ca(OH) | | | Liquor Resulting After Reacting with Ca(OH)$_2$ |
|---|---|---|---|
| NH$_4$Cl grms./1 | NaCl grms./1 | CaCl$_2$ grams./i | NaCl grms./1 |
| 188.8 | 169.7 | 128.6 | 68.2 |

With all the previous results and experiences several pilot plant tests were carried out, the results of which are provided below:

| | PRESENT PROD. Na$_2$CO$_3$ | NECESSARY M$^3$FLP/DAY | BASE 6M$^3$ FLP/TMSA NECESSARY SALT MT/DAY | Na$_2$CO$_2$ RECUPERATED MT/DAY | NaCl Recuperated MT/DAY | NH$_4$Cl Recuperated MT/DAY | WATER Recuperated M$^3$/DAY |
|---|---|---|---|---|---|---|---|
| (1) | 100 | 600 | 66.0 | 22.96 | 14.49 | 46.78 | 289.80 |
| (2) | 200 | 1200 | 132.0 | 45.93 | 28.97 | 93.47 | 579.60 |
| (3) | 300 | 1800 | 198.0 | 68.90 | 43.46 | 140.21 | 869.40 |
| (4) | 400 | 2400 | 264.0 | 91.81 | 57.95 | 186.95 | 1159.20 |
| (5) | 500 | 3000 | 330.0 | 114.84 | 72.43 | 233.68 | 1449.00 |
| (6) | 550 | 3300 | 363.0 | 126.32 | 79.58 | 257.05 | 1593.90 |
| (7) | 575 | 3450 | 379.5 | 132.06 | 83.30 | 268.74 | 1
| (8) | 600 | 3600 | 396.0 | 137.80 | 86.92 | 280.42 | 1738.80 |

Notwithstanding that the process heretofore described is the one applied for the obtention of sodium carbonate by the "Solvay" method (and in particular starting at a plant which uses a mine or trona of mineral salt of sodium chloride), this process is to be used for the obtention of any other alkaline metal carbonates, provided that the specific raw-materials are available and that the product has a specific use and a specific market.

Furthermore, in what is referred to as the aggregation of salt of sodium chloride, in this particular case it is pointed out that besides its abundance and low price, said substance is specially used in this process for the convenience and economy both of the process and of the destiny of the end-product and of the secondary products. However, any other salt or mixture of salts, hydroxides or other compounds may be utilized whether in the initial raw-material or in an aggregate for the secondary obtention of sodium carbonate, as long as they include the sodium ion, such as $Na_2SO_4$ and NaOH, in order to obtain the sodium carbonate and the secondary products such as $(NH_4)_2SO_4$ (in case $Na_2SO_4$ is used), for it has a good market for other industries; or otherwise which contain the alkaline metal ion desired.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A process for the secondary obtension of sodium carbonate from FLP waste liquor in a Solvay process, said liquor containing ammonium bicarbonate, ammonium chloride, sodium chloride and carbon dioxide, which is obtained in a filtering section within the Solvay process for the primary obtention and production of sodium carbonate, and comprising;

adding to the FLP waste liquor a soluble compound containing sodium ions together with a stream of gaseous carbon dioxide to saturate the FLP waste liquor with respect to sodium chloride while precipitating sodium bicarbonate into a first remaining liquor, separating the sodium bicarbonate from the first remaining liquor, then precipitating substantially pure sodium chloride from the first remaining liquor and into a second remaining liquor by subjecting it to a partial evaporation step, and then calcining the sodium bicarbonate for the obtention of a secondary production of sodium carbonate and carbon dioxide.

2. A process for the secondary obtension of sodium carbonate from FLP waste liquor in a Solvay process, said liquor containing ammonium bicarbonate, ammonium chloride, sodium chloride and carbon dioxide, which is obtained in a filtering section within the Solvay process for the primary obtention and production of sodum carbonate, and comprising;

adding to the FLP waste liquor a mixture of soluble compounds containing sodium ions a member selected from the group consisting of sodium chloride, sodium sulfate and sodium hydroxide or a mixture thereof together with a stream of gaseous carbon dioxide to saturate the FLP waste liquor with respect to sodium chloride while precipitating sodium bicarbonate into a first remaining liquor, separating the sodium bicarbonate from the first remaining liquor, then precipitating substantially pure sodium chloride from the first remaining liquor and into a second remaining liquor by subjecting it to a partial evaporation step, and then calcining the sodium bicarbonate for the obtention of a secondary production of sodium carbonate and carbon dioxide.

3. The process for the secondary obtention of sodium carbonate as set forth in claim 1, wherein the sodium chloride in the second remaining liquor is separated therefrom for use.

4. The process for the secondary obtention of sodium carbonate as set forth in claim 2, wherein the sodium chloride in the second remaining liquor is separated therefrom for use.

5. The process for the secondary obtention of sodium carbonate as set forth in claims 3 or 4, wherein the second remaining liquor after the separation of sodium chloride is subjected to a crystallization step to precipitate ammonium chloride into a third remaining liquor containing amonium chloride and sodium chloride in solution, then separating the ammonium chloride from the third remaining liquor, and then subjecting the third remaining liquor containing residual sodium chloride to an evaporation step producing solid ammonium chloride and sodium chloride.

6. The process for the secondary obtention of sodium carbonate as set forth in claim 5, wherein the separated ammonium chloride is returned to the Solvay distillation step.

7. The process for the secondary obtention of sodium carbonate as set forth in claims 3 or 4, wherein the second remaining liquor after the separation of sodium chloride is subjected to a crystallization step to partially precipitate ammonium chloride into a third remaining liquor, separating the ammonium chloride from the third remaining liquor, and then supplying the third remaining liquor to the Solvay process distillation step.

8. The process for the secondary obtention of sodium carbonate as set forth in claims 3 or 4 wherein the second remaining liquor from the separation of sodium chloride is returned to the Solvay process distillation step.

* * * * *